United States Patent [19]
Katou

[11] Patent Number: 6,006,161
[45] Date of Patent: Dec. 21, 1999

[54] LAND VEHICLE NAVIGATION SYSTEM WITH MULTI-SCREEN MODE SELECTIVITY

[75] Inventor: Kiyohide Katou, Anjo, Japan

[73] Assignee: Aisin AW Co., Ltd., Anjo, Japan

[21] Appl. No.: 08/864,620

[22] Filed: May 28, 1997

[30] Foreign Application Priority Data

Aug. 2, 1996 [JP] Japan .................................. 8-204380

[51] Int. Cl.$^6$ .............................. G06G 7/78; G08G 1/123
[52] U.S. Cl. ........................ 701/212; 701/211; 701/208; 345/133; 340/988; 340/990; 340/995
[58] Field of Search .................................. 701/200, 207, 701/208, 209, 210, 211, 212; 340/988, 990, 995; 73/178 R; 342/357, 457; 345/133

[56] References Cited

U.S. PATENT DOCUMENTS

| | | | |
|---|---|---|---|
| 5,587,911 | 12/1996 | Asano et al. | 701/202 |
| 5,748,109 | 5/1998 | Kosaka et al. | 340/995 |
| 5,760,713 | 6/1998 | Yokoyama et al. | 701/211 |
| 5,774,073 | 6/1998 | Maekawa et al. | 701/210 |
| 5,784,059 | 7/1998 | Morimoto et al. | 701/208 |
| 5,793,310 | 8/1998 | Watanabe et al. | 701/201 |
| 5,796,613 | 8/1998 | Kato et al. | 701/208 |

FOREIGN PATENT DOCUMENTS

| | | |
|---|---|---|
| 4-335390 | 11/1992 | Japan . |
| 7-217865 | 8/1995 | Japan . |
| 7-249227 | 9/1995 | Japan . |
| 7-249969 | 9/1995 | Japan . |
| 8-107921 | 4/1996 | Japan . |

*Primary Examiner*—Jacques H. Louis-Jacques
*Attorney, Agent, or Firm*—Oliff & Berridge, PLC

[57] ABSTRACT

A land vehicle navigation apparatus provides a present location map and various easily understood guidance information items in conformity with the environmental criteria of a route. The navigation apparatus includes information storage for storing map data as to route search, route guidance, and other guidance data, a present position detector for detecting the present position of the vehicle, an input device for inputting commands and information for route search and route guidance, and a display monitor unit for displaying a guidance screen with a map and other information relating to the route search and route guidance in a one-screen mode, or in a multiple-screen mode. A display controller responds to an input command via the input device, reads guidance data from the information storage, and controls the display of resultant read data on the display unit. Changes between the one-screen mode and the multiple-screen mode may occur with the screen of the one-screen mode of the display corresponding to one screen of the multiple-screen mode and a present-location map screen corresponding to another screen.

16 Claims, 15 Drawing Sheets

GUIDANCE ROAD DATA

| NUMBER OF ROADS (n) | |
|---|---|
| 1 | ROAD NUMBER |
| | LENGTH |
| | ROAD ATTRIBUTE DATA |
| | SHAPE DATA ADDRESS & SIZE |
| | GUIDANCE DATA ADDRESS & SIZE |
| | ⋮ |
| n | ROAD NUMBER |
| | LENGTH |
| | ROAD ATTRIBUTE DATA |
| | SHAPE DATA ADDRESS & SIZE |
| | GUIDANCE DATA ADDRESS & SIZE |

FIG.2A

SHAPE DATA

| NUMBER OF NODES (m) | |
|---|---|
| 1 | EAST LONGITUDE |
| | NORTH LATITUDE |
| | HEADING |
| | ⋮ |
| m | EAST LONGITUDE |
| | NORTH LATITUDE |
| | HEADING |

FIG.2B

LAND VEHICLE NAVIGATION SYSTEM WITH MULTI-SCREEN MODE SELECTIVITY

BACKGROUND OF THE INVENTION

1. Field of the Invention

The invention relates to electronic navigation systems, and more particularly to a method and apparatus for providing navigation route guidance information in audible and/or visible form. The guidance information is provided to the operator of a land vehicle along a desired route between a start location and a desired destination as specified by the operator.

2. Description of the Prior Art

A variety of different navigation devices have been developed for providing the operator or user of a land vehicle with adequate guidance information along a route of travel. For example, one prior art device performs a route search to a target destination, attaining visible and/or audible guidance of a route to the destination by the use of maps. Another prior art device displays only a map covering a certain range with the vehicle's present position as its center point.

Conventional navigation systems with route search and guidance functions may include systems for performing concise and simple guidance by displaying a limited amount of information such as the distance to a next-to-turn road intersection during travel and guidance along a presently recommended route.

Another system is disclosed, for example, in Published Unexamined Japanese Patent Application (PUJPA) No. 4-335390. This system is capable of simultaneously providing the positional relationship of a destination and the present position of the vehicle and its surroundings by making use of dual screens which permit visual indication of a wide-area map covering both the present location and the destination along with a precise or detailed map around the present position.

A further prior art navigation system is capable of providing simple information concerning the direction of travel by displaying travel images using three-dimensional (3D) visual effects. Unfortunately, this system is designed to limit necessary guidance information to a minimum and results in a "trade-off", as discussed below. While this system may offer certain advantages, such as an increase in the visibility of guidance information displayed, the system suffers from a problem in that information tends to become insufficient in some cases.

With the system designed to display a wide-area map and detailed map using two divided screens, the vehicle operator may recognize the positional relationship of the destination and the present vehicle location in addition to the detailed information near or around the present location. However, the display of detailed information near the present vehicle location decreases by half in the display region due to employment of the two-screen division scheme. Another problem faced with this system is that recognizability of detailed on-map information displayed decreases with a reduction in the display scale (to enlarge a displayable coverage on the screen).

With the system using a 3D-display scheme for display of travel images, there is a drawback that a sufficient amount of information will not be available on the maps.

SUMMARY OF THE INVENTION

The invention provides a new and improved navigation system capable of avoiding the problems of the prior art.

The invention provides a land vehicle navigation apparatus capable of providing vehicle operators with navigation guidance information with enhanced visibility and increased accuracy.

The invention also provides a land vehicle navigation route apparatus capable of attaining, with enhanced versatility and flexibility, a variety of relevant guidance information in conformance with variable surrounding environmental conditions displayed on a present-location map.

To attain the foregoing objects, the present invention provides a specific land vehicle navigation apparatus including an information storage device for storing map data as to route search, route guidance and other guidance data, a present position detector for detecting the present position of a vehicle, and an input device for entering commands and information for route search and route guidance. The apparatus also includes a display device for displaying a guidance screen of maps and other items relating to route search and route guidance either in a one-screen display mode or in a two-screen display mode.

The terminology "one-screen" as used herein may refer to the full screen area of the display device whereas the term "two-screen" may refer to simultaneous activity of multiple screens. As will be demonstrated in a later embodiment, such multiple divided screens may be two coexisting screen regions.

The apparatus further includes a display controller which responds to the entry of an input command via an input device for reading guidance data from the information storage device and controls the display of resultant read data at the display device. Importantly, the display controller performs an alternate change or switching between the one-screen display mode and two-screen mode with the screen of the one-screen mode of the display device corresponding to one screen of the two-screen mode while letting a present position map screen correspond to the remaining screen of the two-screen mode.

In accordance with another aspect of the invention, when changing to the two-screen display mode during route guidance, the display controller is responsive to receipt of criteria for a present position by displaying on the one screen a schematic diagram screen representative of travel images using three-dimensional (3D) visual effects or an architectural structure shape map screen indicative of the shape of an architectural structure. The display controller displays the schematic diagram screen on the one screen when the vehicle is traveling on a highway or expressway. Alternatively, the display controller displays the architectural structure shape map screen on the one screen when the vehicle is traveling within towns or cities. Where a characteristic object of interest is present ahead of the present position, the display controller operates to display a screen containing information relating to the characteristic object.

These and other objects, features and advantages of the invention will be apparent from the following more particular description of preferred embodiments of the invention, as illustrated in the accompanying drawings.

BRIEF DESCRIPTION OF THE DRAWINGS

FIGS. 2A and 2B are diagram showing an exemplary configuration of guidance road data files as stored in an information storage device;

DETAILED DESCRIPTION OF THE INVENTION

Figure 1:
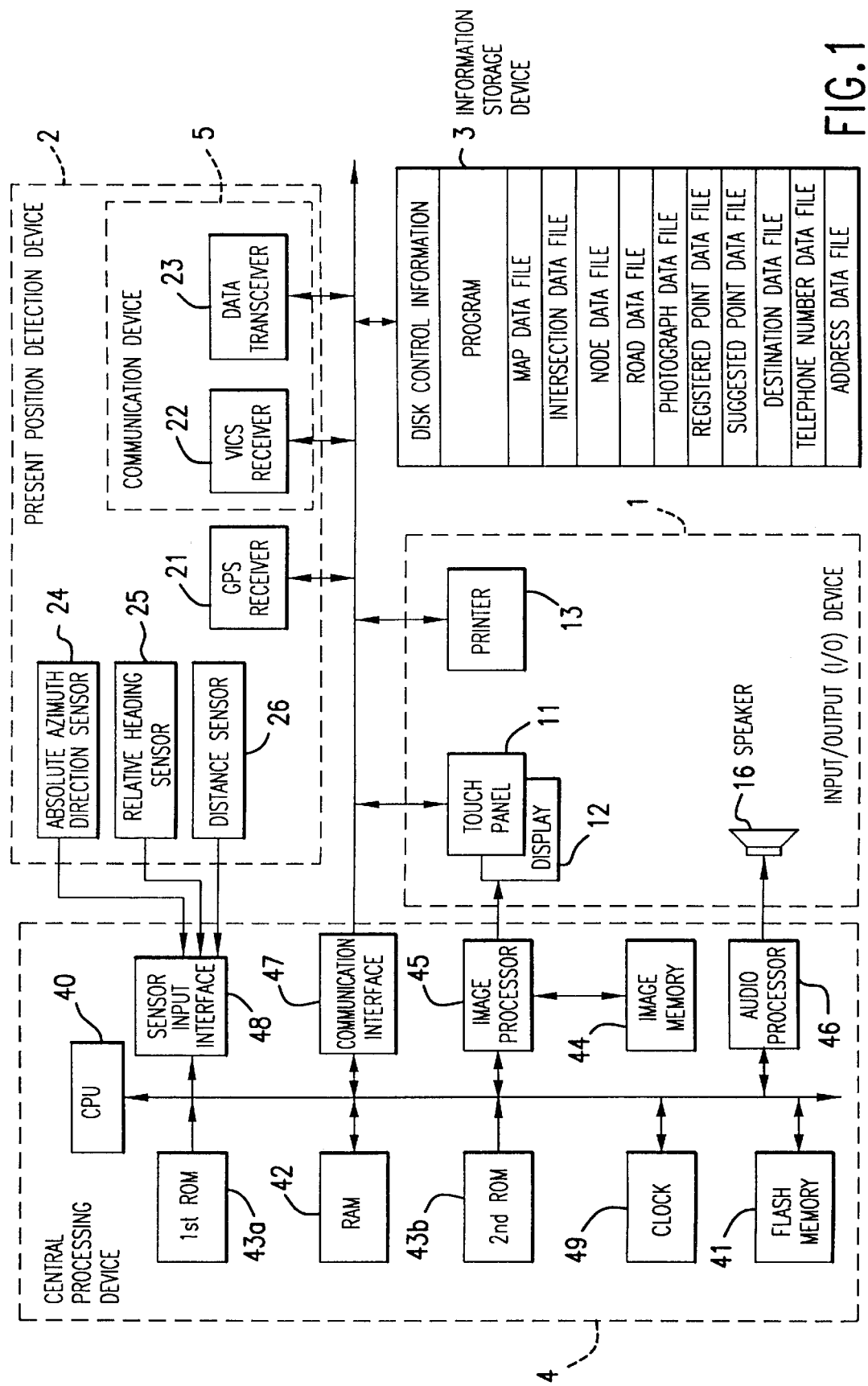
FIG. 1 is a block diagram showing an overall configuration of navigation apparatus in accordance with the present invention.

Referring to FIG. 1, the navigation apparatus includes an input/output (I/O) device 1, a present vehicle position detector device 2, information storage 3, and central processing device 4 (referred to as the "main controller" hereinafter). The I/O device 1 permits selection and execution of several information items as for route search and various other functions. The present position detector 2 operates to detect the present position of a land vehicle. The information storage 3 stores navigation data necessary for calculation or computation of routes, display/speech guidance data and programs (operating system and/or applications) as required for execution of route guidance, etc.

The main controller 4 is operatively coupled to the I/O 1, present position detector 2, and storage 3. The main controller 4 controls the entire system, and provides route guidance information audibly and visibly to a vehicle operator along a desired navigation route. In other words, controller 4 performs any necessary display/speech guidance procedure routines as required to execute route search routines and route guidance and provides controls over the entire system operation.

The I/O device 1 instructs the main controller 4 to execute navigation processing in response to the vehicle operator's intent while permitting the production of a printed output or "hard copy" of the processed data. This enables both input of any desired destination location and output of required route guidance information in an audible and/or visible manner upon a request from the vehicle operator. To attain these functions, I/O device 1 includes a data/instruction entry device for inputting a request for routine guidance. This device may be a touch-sensitive panel 11 and may include manual switches for permitting the input of the destination by, for example, the use of telephone numbers and the coordinates on a map.

The data/instruction entry device may alternatively be a detachable or remote control unit, as necessary. The I/O device 1 also has an output section, which includes a visual display unit 12, a printer 13 and a speaker 16. The display unit 12 has its screen associated, with the touch panel 11. Display unit 12 visually indicates input data and automatically displays route guidance in response to a request from the vehicle operator. The printer 13 outputs data processed by the main controller 4 and data stored in the information storage 3. The speaker 16 audibly provides route guidance information and associated data by issuing guidance from prerecorded voices.

The I/O device 1 further includes a speech recognition apparatus for enabling speech input and a record-card reader device for reading data prestored in an integrated circuit card or magnetic card as needed. In addition, the data communication apparatus can be further implemented to allow data communications with associated information sources, including a personal computer, that may prestore user-specific data, such as map data and destination data.

The display unit 12 may include either a color cathode-ray tube (CRT) monitor or color liquid crystal display (LCD) module, for visual representation of all the navigation data as color images. The various displays may involve a route display based on map data and guidance data processed by the main controller 4, a range diagram, a road-intersection diagram, and the like. The display unit 12 also simultaneously displays "virtual" buttons for use in setting any desired route guidance, for performing switching or changeover operations of guidance screens during route guidance, and selection/activation of various functions. In addition, intersection information for certain road intersections through which the vehicle is expected to pass is color-displayed on a "pop-up" range diagram window which will pop up on the screen when required.

The display unit 12 is embedded inside the dashboard near the driver's seat in the vehicle, enabling a vehicle operator to view and verify his or her vehicle's present location and acquire necessary information concerning a route along which the vehicle is to travel. The touch panel 11 is positioned to correspond to the virtual function buttons displayed, thereby permitting execution of the above functions in response to a signal input through the vehicle operator's manual touch on any one of the buttons. The configuration of the input signal generation device, as structured from the buttons and touch panel 11, is known to those skilled in the art to which the invention pertains, and a detailed explanation thereof will hereby omitted from the description.

The present-position detector 2 detects or receives information as to a present position of the vehicle. To this end, the present-position detector 2 may include an absolute azimuth direction sensor 24 including a terrestrial magnetism sensor or sensors, a relative azimuth sensor 25 including a vehicle steering sensor, gyro and the like, a distance sensor 26 for detection of the elapsed distance of travel based on the rotation number of wheels, and a global positioning system (GPS) radio receiver device 21 and associative communication device 5 which uses the GPS.

The communication device 5 may include a vehicle information and commutation system (VICS) receiver 22 as a traffic information acquisition device, and data transmitter/receiver device 23. The VICS is the system which functions to transfer road traffic information to land vehicles in a real-time manner by means of FM multiplexer (character broadcast), radio-wave beacon, and/or optical beacon. The FM multiplexer transfers rough or course information in an area of extended coverage whereas the information of the radio-wave beacon and optical beacon is precise or detailed information with respect to a narrow range within a radius of approximately 10 KM from the center of each beacon. With respect to a link number associated with each road, the VICS transmission data may consist of a traffic delay/congestion index that is indicative of, for example, the degree of road conditions (such as closed lanes, traffic jams, congestion, excess traffic, etc.), a traffic jam position, traffic jam length, traffic control (such as road-maintenance information, blocked lanes, etc.) and traveling time (based on a certain speed). The data transmitter/receiver device 23 may be either a portable or handheld telephone set or a personal computer, which is responsive to the receipt of a vehicle operator requests for necessary navigation information from a remote traffic information center (for example, Automobile Traffic Information System (ATIS)).

The information storage 3 is an external data storage unit which makes use of external recording media including, but not limited to, a compact disc read only memory (CD-ROM) drive, an optical CD-ROM drive, an IC card reader or the like. Large-capacity data recording media, such as CDs, IC cards, or any equivalents thereof, are associated with storage devices for storing a navigation program and data. The program may include an operating system (OS) section and an application software section. The latter may essentially consist of a map drawing section, route search section, route guidance section, present-position calculating section, destination setting operation control section, etc. Prestored programs include a program for execution of route search procedures or the like, a program for performing a display output control as necessary for display guidance of a route or routes and audible output control required for speech guidance of the same, and any data required therefor, and further, display information data necessary for route guidance and displaying of maps. Moreover, the data contains all the information necessary for navigation, such as map data, road intersection data, road/street data, several kinds of guidance data items, and the like.

More practically, stored programs include a route-search software program for defining a route and setting a destination and a waypoint based on both position information from the present-position detector 2 and an input signal from the touch panel 11, a program for executing conversion of the desired route data based on traffic information as acquired by the communication device 5 and reexecuting the route search program, a route information conversion software program for drawing a desired route with 3D visual effects, a program for determining the timing and content of a speech output along the route, etc. Respective navigation functions may be performed by activating these programs as stored in the information storage 3.

The main controller 4 may include a central processing unit (CPU) 40 for execution of a variety of operational or arithmetic processes. Controller 4 also includes an electrically erasable and programmable read only memory, such as a "flash" memory 41, for storing one or more programs read from the CD of the information storage 3. The flash memory 41 is a rewritable semiconductor memory device of the type capable of being reprogrammed or updated upon alteration or modification of the programs in the CD. The controller 4 further includes a first ROM 43a that stores a memory content management program for verifying and updating the programs stored in the flash memory 41, a random access memory (RAM) 42 for temporal storage of data under arithmetic processing and any route guidance information such as the geographical coordinates of a specified destination, route number, etc. A second ROM 43b stores display information data as necessary for route guidance and map display. Note that the program for execution of updating procedures stated above may alternatively be stored in the external storage device.

Moreover, the main controller 4 includes an image memory for storage of image data for use in the screen display. A digital image processor 45 is provided to obtain image data from the image memory on the basis of a display control signal from the CPU 40 for image processing and output to the display unit 12. A digital voice data processor 46 responds to receipt of a speech output control signal from the CPU 40 for combining by superimposition techniques speech, audible phrase, self-explanatory sentence or voice message, etc., as read from the RAM 42 and converts speech into a corresponding analog signal for output to the speaker 16. A communication interface 47 transmits and receives input/output communication data. A sensor input interface 48 is connected to obtain a sensor signal of the present-position detection device 2. A clock 49 writes a date and time into internal dialog information.

In the main controller 4, when data acquired by the present-position detector 2 is input via the sensor input interface 48, the CPU 40 attempts to calculate the coordinates of a present position when a predetermined time has elapsed, and then temporality writes or programs the position into the RAM 42. The coordinates of this present position is a result of the execution of map-matching processing in view of any possible detection errors of respective kinds of data items. An output value of each sensor is always subject to correction. The route guidance is performed with a screen display and audible speech output while the presence or absence of the speech output remains selectable by the vehicle operator.

As shown in FIG. 2, the guidance data file stored in the information storage 3 is the data necessary for the route search section to calculate a route and to perform route guidance. As shown in FIG. 2A, the guidance road data file consists of addresses, road numbers, road length, road attribute, shape data, as and guidance for a respective number $\underline{n}$. The road number is an identification number which has been set independent of each direction with respect to each road segment between adjacent branch points or "way points", such as road intersections or the like, along all the roads as contained on a map. The road attribute data is specific data indicative of the kinds of roads or streets involved, for identifying a road as an elevated way, subway road, highway, national road, ordinary road, turnpike, etc. The shape data is data indicative of the shape or pattern of a road. As shown in FIG. 2B, where the individual road is subdivided into portions at a plurality of nodes, the shape data may have coordinates consisting of a combination of the longitudinal and latitude variables with respect to each node number $\underline{m}$. The guidance data may consist of road intersection (or branch point) name, presence or absence of traffic signal, landmarks (traffic signs, advertising signs gas stations, convenience stores, etc.), caution data (railroad crossings, tunnels, etc.), road-name data, and destination data.

Figure 3:
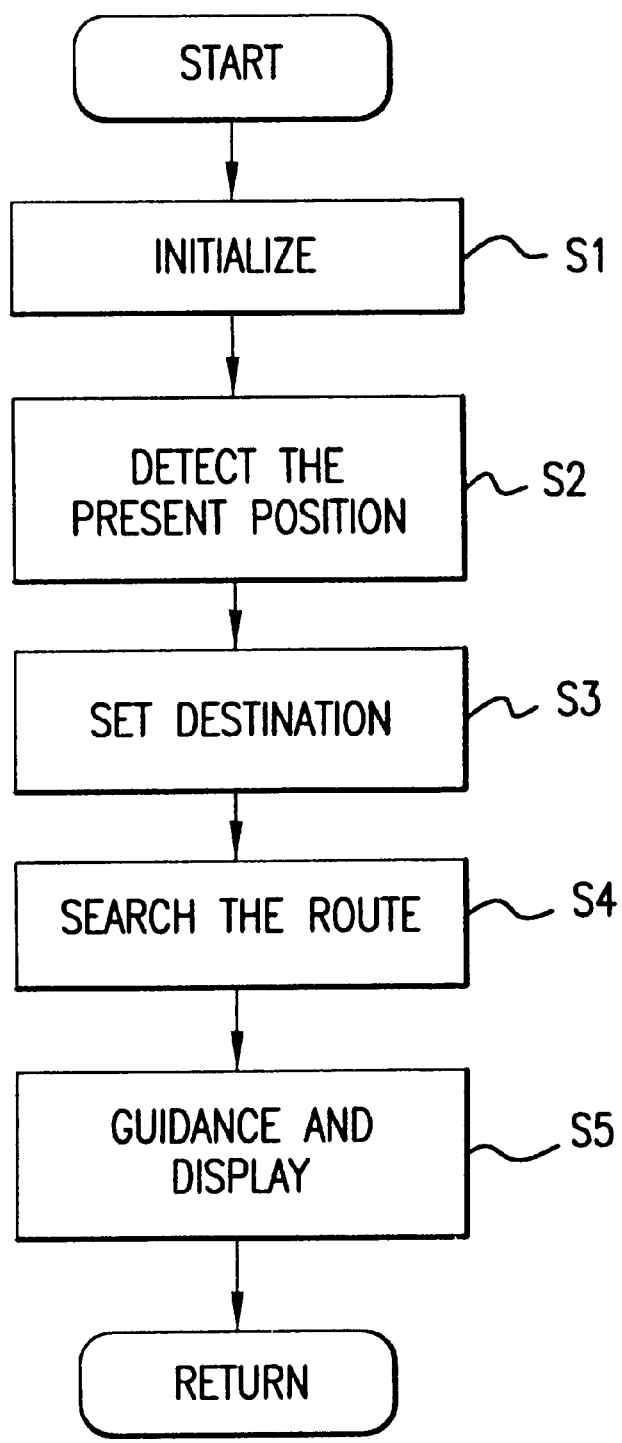
FIG. 3 is a flowchart of the system control procedure as implemented in the navigation apparatus embodying the invention.
Figure 4:
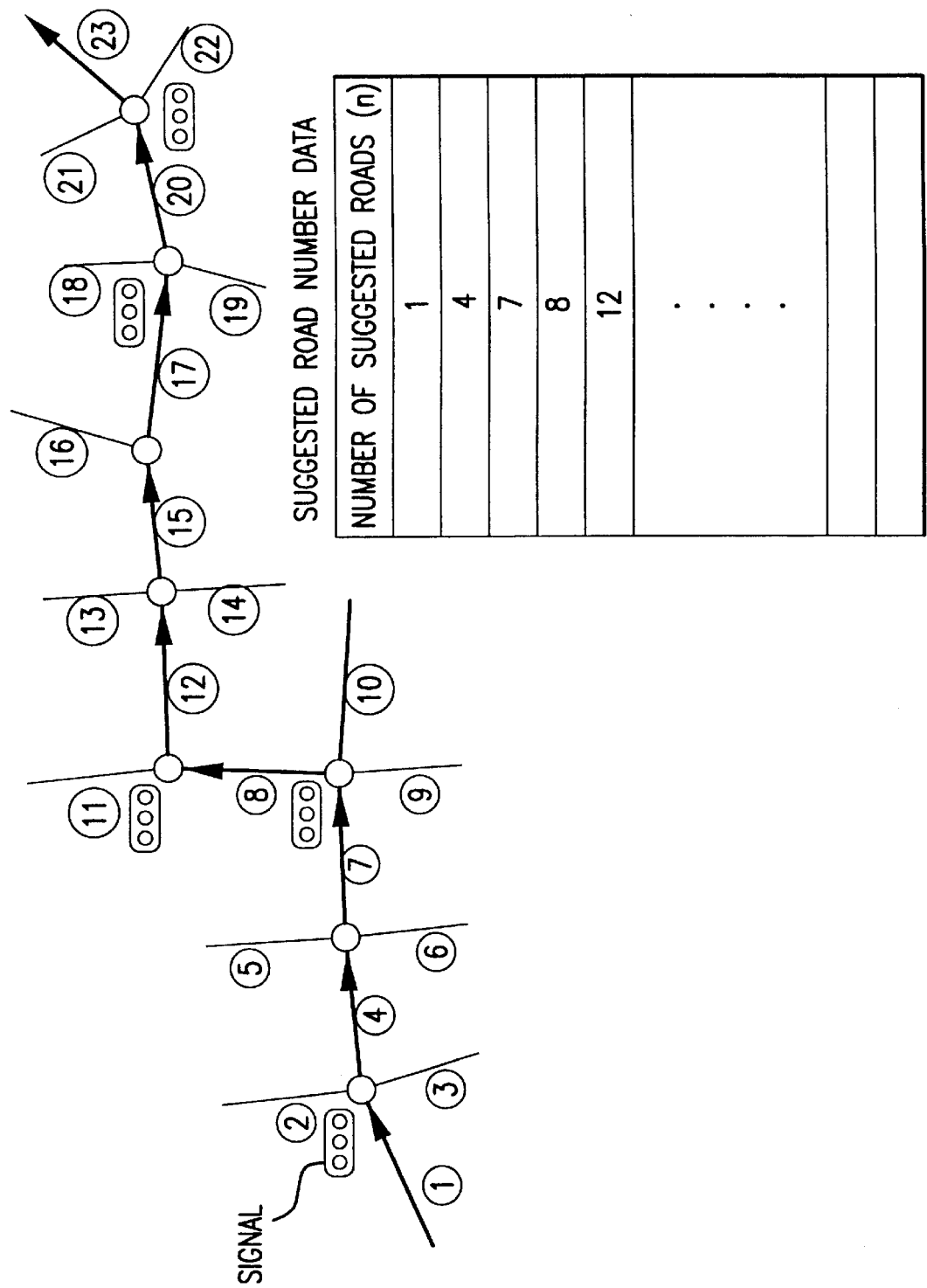
FIG. 4 is a depiction of guidance road number data as obtained by a route search following the procedure of FIG. 3.

The overall flow of system processing of the navigation apparatus is shown in FIG. 3. First, initialization processing is performed causing the CPU 40 to read a navigation program out of the CD-ROM. The program is then stored in the flash memory 41 (step S1) Then, in deference to this navigation program, the present-position detector 2 detects a present position and allows its nearby-region map to be displayed with the detected present position being identified as the center position (step S2). Next, a destination is set using a telephone number, administrative address, facility name, registration point, etc. (step S3). Thereafter, route search processing is conducted from the present position to the destination (step S4). More than one road segment along the route may be displayed and set as guidance road number data, as shown in FIG. 4. Upon determination of a route, display and/or speech output of route guidance occurs until the vehicle reaches the destination and the present-position detector 2 tracks the changes in a present position (step S5).

Figure 5A:
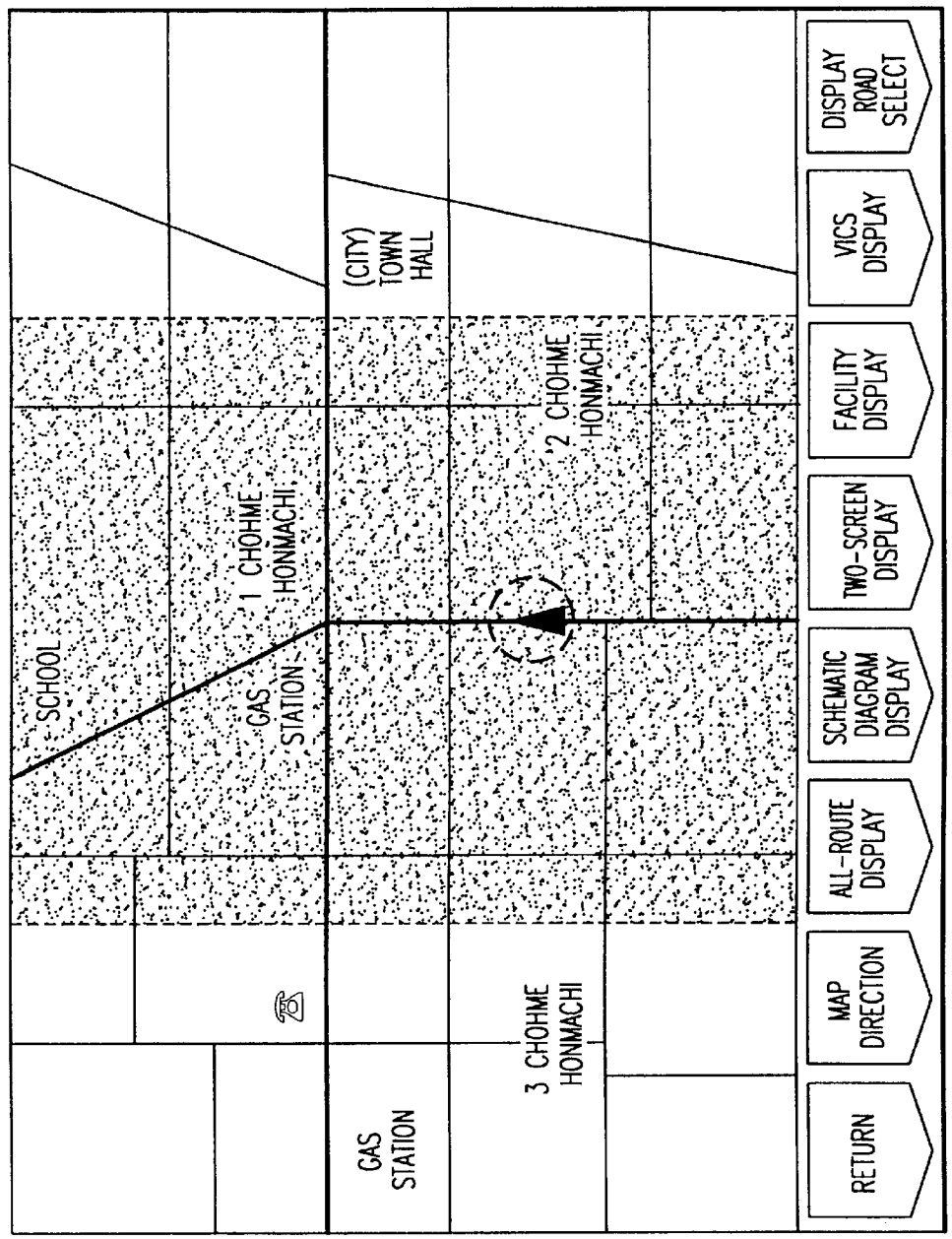
FIGS. 5A and 5B are diagrams illustrating an exemplary layout arrangement of an image on a display screen.
Figure 5B:
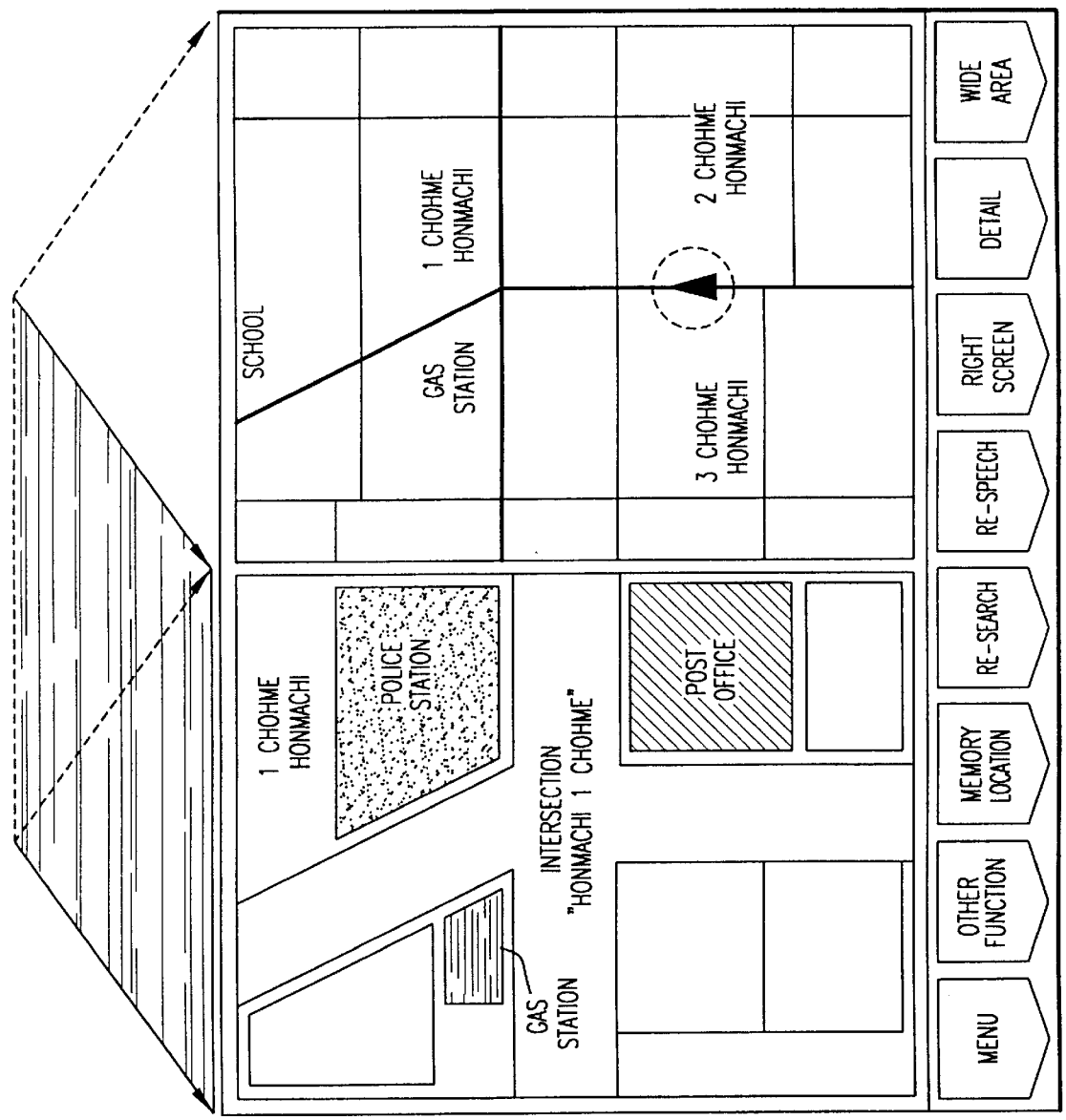

The navigation apparatus embodying the present invention is specifically structured to perform switching between the one-screen display mode shown in FIG. 5A and two-screen mode shown in FIG. 5B. In the two-screen mode, a present-location map screen with a present location being its center, is displayed on one of the two screens—for example, the right-side screen—while allowing the remaining screen—for example, the left-side screen—to be used for displaying, for example, an architectural structure-shape map, a schematic diagram, a city map, or other available functions.

In the one-screen mode shown in FIG. 5A, the present-location map screen is displayed. In the two-screen mode shown in FIG. 5B, the architectural structure-shape map screen, containing the city map, is displayed on the left-side screen, and the present location map screen is displayed on the right-side screen. This arrangement allows a layout of buttons at the lower side of the screen for manual operation, whereby touching of one of these buttons or depression of a corresponding hardware button, performs a display-mode changeover and/or screen changeover enabling a call-up of each function.

A description of the function of respective buttons shown in FIG. 5A are as follows. The "virtual" button "RETURN" on the display screen either returns the present-location map to the screen during scrolling or returns the original screen in a specified mode. The "MAP DIRECTION" button changes between a north-directing map that always regards the North as its upward direction and a map which constantly regards a direction of travel as the upward direction. The "ALL-ROUTE DISPLAY" button displays all the routes developed after completion of a route search. "SCHEMATIC DIAGRAM DISPLAY" displays a schematic diagram screen representing 3D-travel images during route guidance. This button changes to "SCHEMATIC DIAGRAM OFF" during display of the schematic diagram. The "TWO-SCREEN DISPLAY" changes to the two-screen display during operation of the one-screen display. During the two-screen display, this button changes to "RE-SPEECH."

The "FACILITY DISPLAY" button displays marks representing facilities at corresponding positions on a map, such as, for example, gas stations, restaurants, fire stations, etc. During display of such facilities, this button changes to "FACILITY ERASE." A "VICS" button becomes active when VICS equipment is connected. During display of VICS, the button changes to "VICS ERASE." "DISPLAY ROAD SELECT" selectively displays highways when the VICS display is active.

An example of the two-screen display mode is shown in FIG. 5B. In this two-screen mode, a map having a present location at its center is displayed. When the vehicle approaches a target intersection where a change in the direction of travel is expected, the right-side screen is assigned as a guidance screen for displaying an enlarged or scale-magnified diagram of the intersection. The left-side screen serves as a multi-function screen which may display a schematic diagram for presentation of additional information, an architectural structure-shape map screen containing a city map, or any other display screens for a variety of different purposes.

Of those buttons being displayed on the screen shown in FIG. 5B, the "MENU" button calls is to be operated when calling a menu screen whereas "OTHER FUNCTIONS" calls each kind of function. "MEMORY LOCATION" button sets a location in the memory where a destination or the like is to be stored or recalled from memory. "RE-SEARCH" searches for different route or routes other than the previously charted route upon the occurrence of a detour to the destination. "RE-SPEECH" reissues the guidance voice for confirmation.

"RIGHT SCREEN" controls the right-side screen. Upon execution of this operation, it is possible to change a present-location map being displayed on the right-side screen to a detailed wide-area map and enable modification of the direction of the map. Accordingly, in this mode, the "RETURN," "MAP DIRECTION," "DETAIL," and "WIDE-AREA" buttons are displayed and will be reset upon activation of the "RETURN" button. Since it is also possible to display the map on the left-side screen, it is also possible to activate the "DETAIL" and "WIDE-AREA" buttons without having to operate the "RIGHT SCREEN" button.

As previously discussed, since the operation may change in correspondence with the display mode of the screen, the buttons to be activated for execution will be suitably changed and set accordingly.

The buttons illustrated are mere examples, and the button settings may be freely modified in respective modes.

Figure 6A:
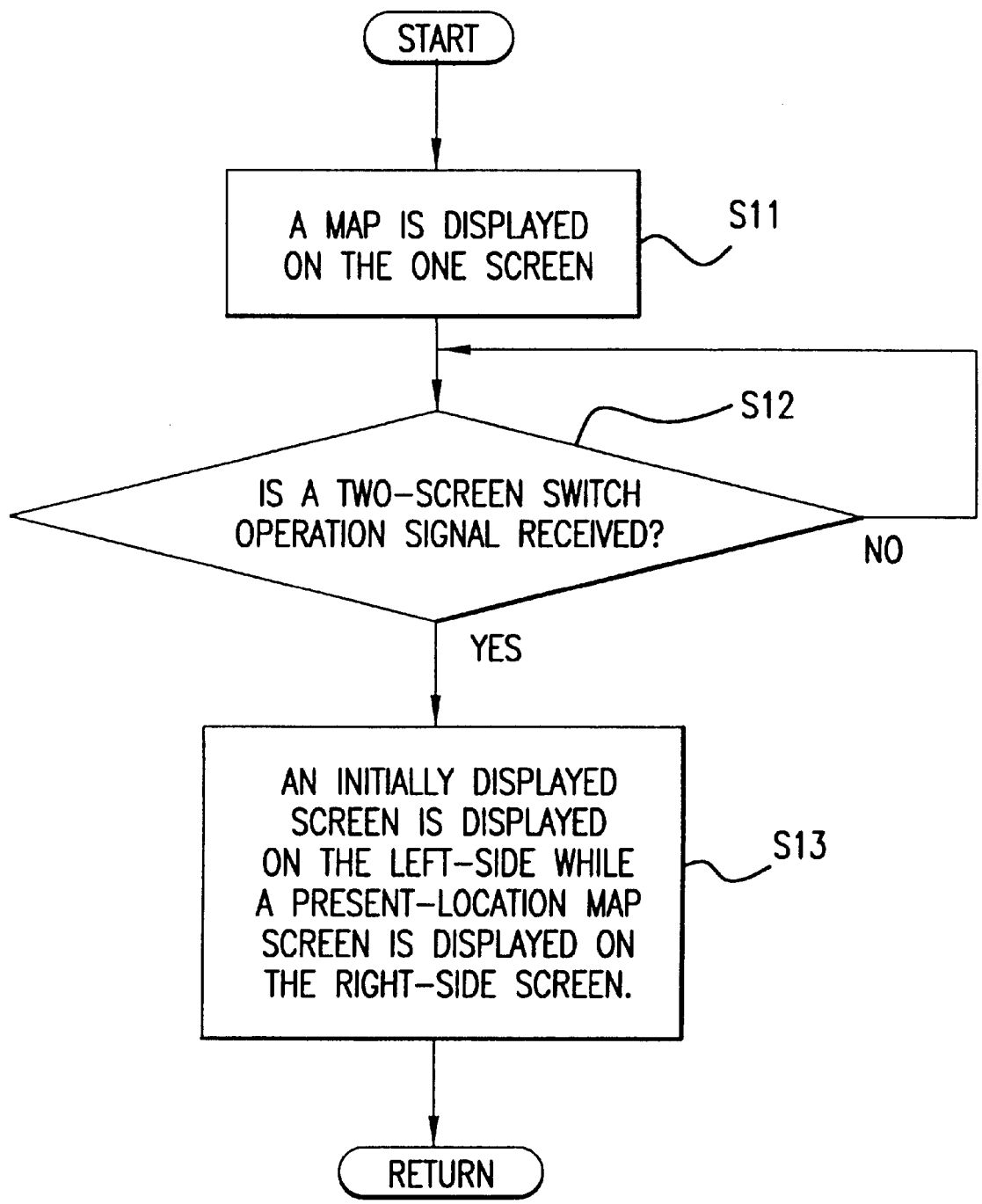
FIGS. 6A and 6B are flowcharts of an example of a process for switching from a one-screen display mode to a two-screen display mode.

Screen changeover processing occurs as set forth below. First, the basic process for changing from the one-screen mode to the two-screen mode is as follows. As shown in FIG. 6A, for example, when a map is displayed on the one screen (step S11), a determination is made whether a two-screen switch operation signal has been received (step S12). Upon receipt of the two-screen switch operation signal, the initially displayed screen is displayed on the left side while a present-location map screen is displayed on the right-side screen (step S13).

Figure 6B:
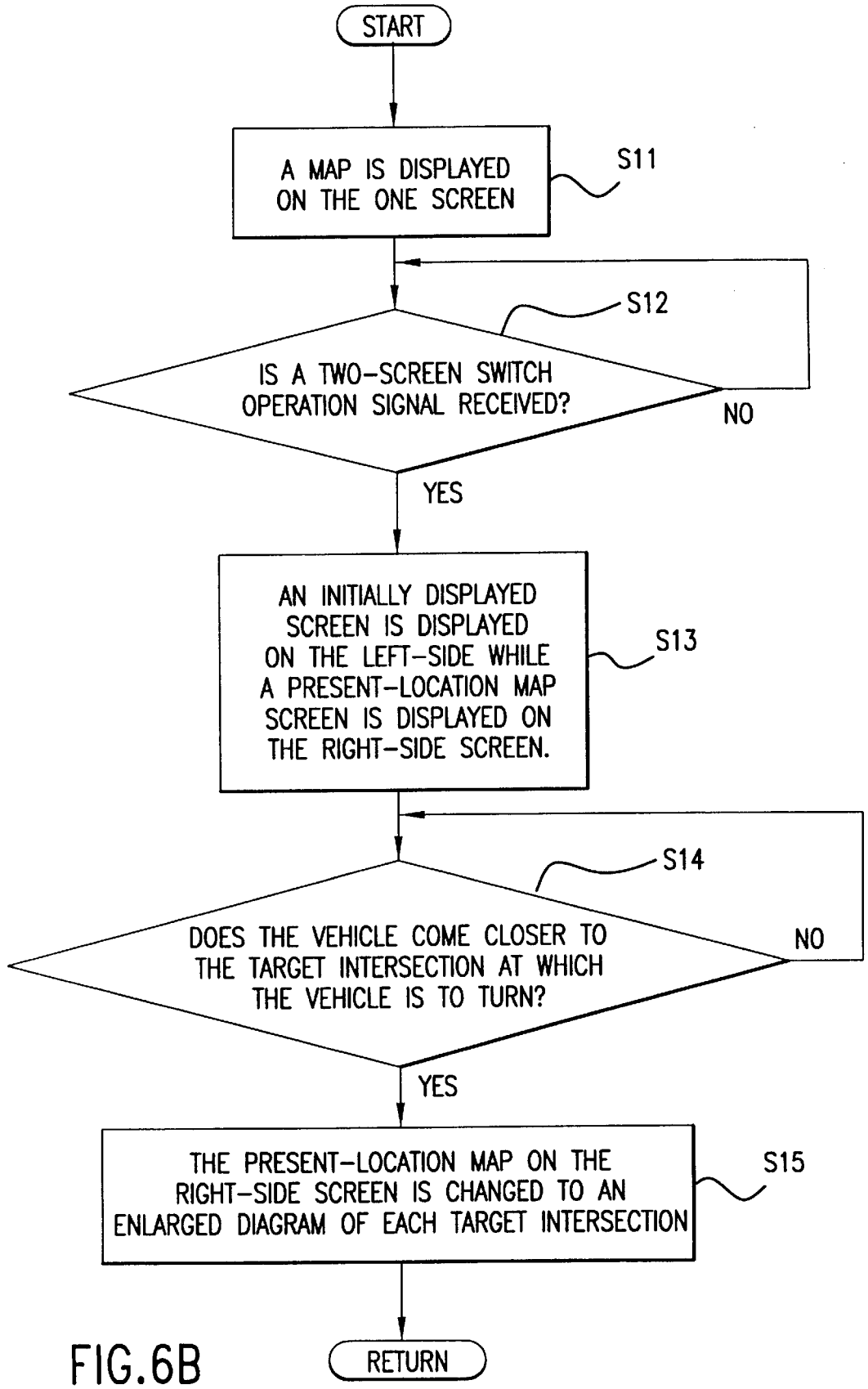

Furthermore, after the changeover from the one-screen display mode to the two-screen mode is completed, the system waits for the vehicle to approach a target intersection at which the vehicle is to turn, as shown in FIG. 6B (step S14). When the vehicle the target intersection, the right-side screen changes from the present-location map screen to an enlarged diagram of the target intersection (step S15).

Figure 7:
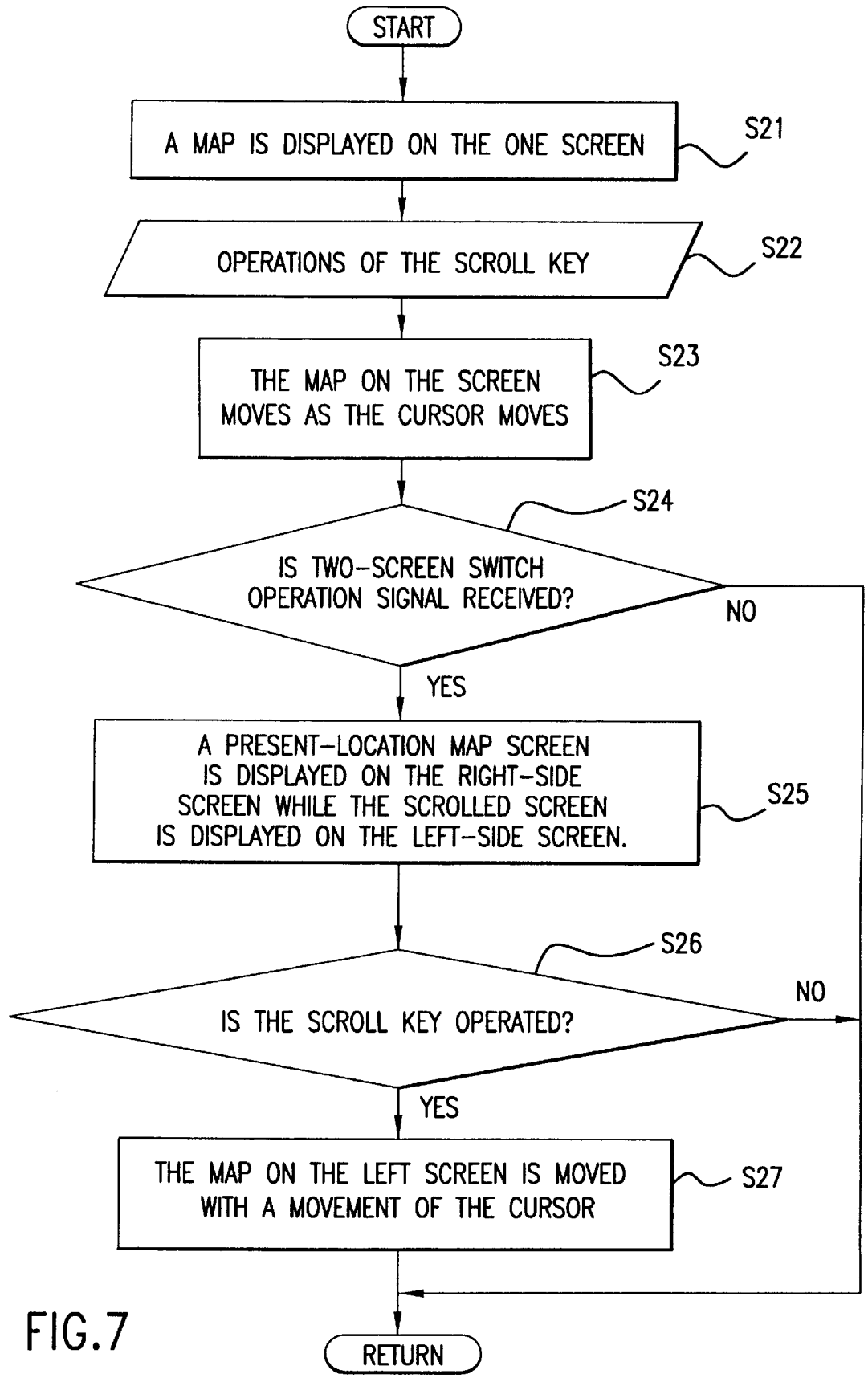
FIG. 7 is a flowchart of an example of screen control processing upon activation of scrolling operations.

In addition, maps may be scrolled to find a map containing a desired location onto the screen thereby changing to the two-screen mode. In this situation, when the map is displayed on the one screen as shown in FIG. 7 (step S21), in response to the operation of the scroll key (step S22), the map on the screen moves as the cursor moves (step S23). The system then determines whether a two-screen switch operation signal is received (step S24). Upon receipt of the two-screen switch operation signal, the left-side screen displays the resultant scrolled screen while simultaneously displaying a present-location map screen on the right-side screen (step S25). If the scroll key is further operated (step S26), the map on the left screen moves with the movement of the cursor (step S27).

An explanation will now be given of one example in which a map and a schematic diagram are displayed while changing between the one-screen mode and two-screen mode in conjunction with FIGS. 8–10B.

Figure 8:
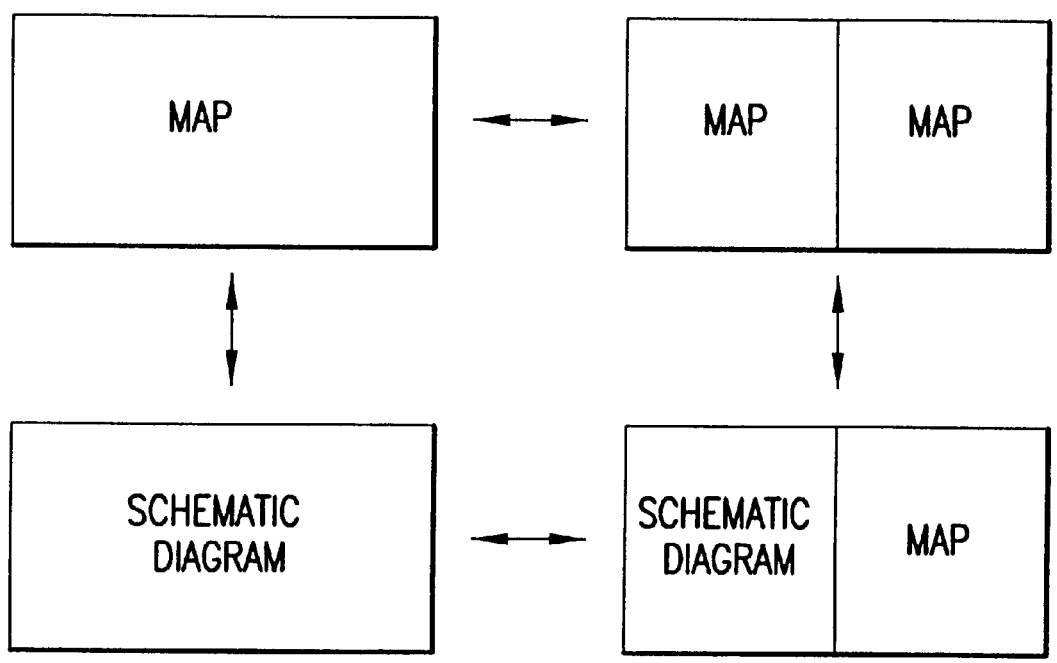
FIG. 8 is a diagram of the display changes between the one-screen mode and two-screen mode.

Assume here that a map and a schematic diagram are prepared as display screens. Also assume that the display mode is changed between the one-screen mode and two-screen mode. In this case, as shown in FIG. 8, it is possible to selectively change between a map or a schematic diagram for display in the one-screen mode, and also change to display either a combination of maps and map or a combination of a schematic diagram and a map in the two-screen mode. Here, as has been described previously, the right-side screen in the two-screen mode is used for displaying guidance maps. This screen displays a present-location map or displays an enlarged intersection diagram screen when the vehicle nears an intersection where turn is expected. On the other hand, the left-side screen is assigned to display the various-function screens of a map display, schematic diagram display, etc. When a change occurs between the one-screen mode and two-screen mode, the screen of the one-screen mode corresponds to the left-side screen of the two-screen mode.

Figure 9A:
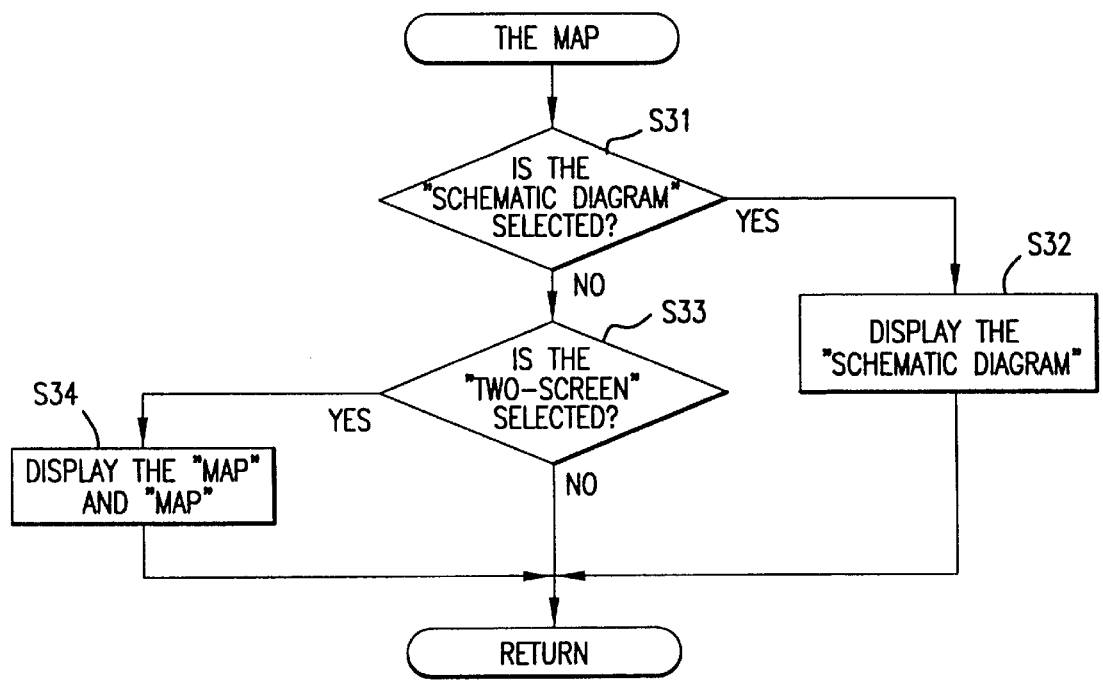
FIG. 9A is a flowchart of an example of a screen change process in the one-screen mode.

Another example of the transition process during changeover of these simple screens, is discussed below. Assume that a map and a schematic diagram are available as the display screen. By way of example, consider that the map is being displayed in the one-screen mode. As shown in FIG. 9A, the system checks to see if the "SCHEMATIC DIAGRAM" button is selected (step S31). If the "SCHEMATIC DIAGRAM" button was selected, then a schematic diagram is displayed (step S32). If the schematic diagram is not selected then the system further checks to see whether the "TWO-SCREEN" button is selected (step S33). If the "TWO-SCREEN" button was selected, the system switches to the two-screen mode so that the map which was displayed in the one-screen mode is displayed on the left-side screen while allowing a present-location map to be displayed on the right-side screen (step S34).

Figure 9B:
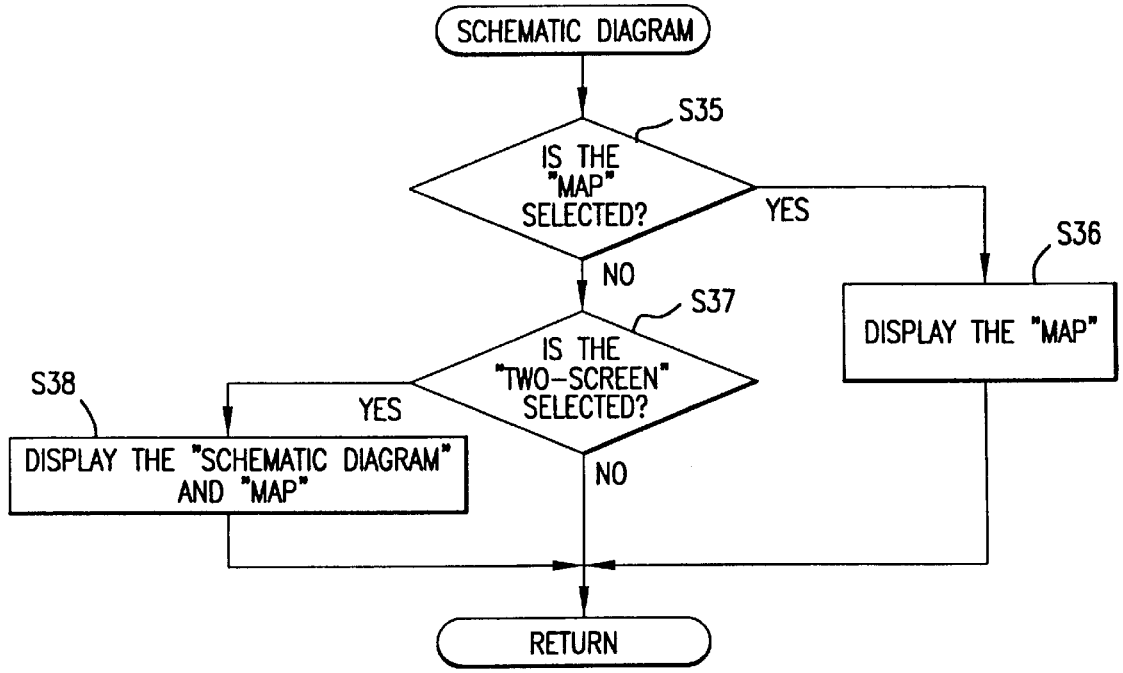
FIG. 9B is a flowchart of another screen change procedure.

Alternatively, as shown in FIG. 9B, where a schematic diagram is being displayed in the one-screen mode, the system checks whether the "MAP" button is selected (step S35). If the "MAP" button was selected, a map is displayed (step S36). Where the "MAP" is not selected, the system further checks to see if the "TWOSCREEN" button is selected (step S37). If the "TWOSCREEN" button was selected, the system changes to the two-screen mode so that the schematic diagram which was displayed in the one-screen mode is now displayed on the left-side screen while a present-location map is displayed on the right-side screen (step S38).

Figure 10A:
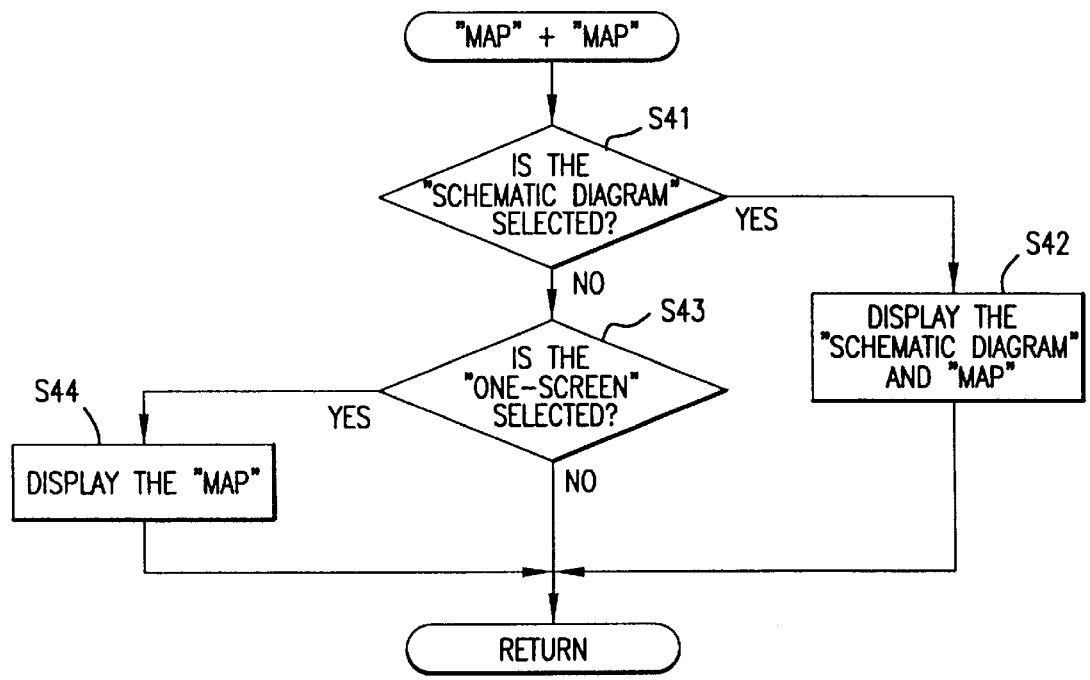
FIG. 10A is a flowchart of an example of a screen change process in the two-screen mode.

Next, as shown in FIG. 10A, where maps are displayed on the both screens in the two-screen mode, the system checks to see if the "SCHEMATIC DIAGRAM" button is selected (step S41). If the "SCHEMATIC DIAGRAM" button was selected, a schematic diagram is displayed as the map on the left-side screen (step S42). If "SCHEMATIC DIAGRAM" is not selected, the system further checks to see if the "ONE-SCREEN" button is selected (step S43). If the "ONE-SCREEN" button was selected, the system then changes to the one-screen mode to display the map that was displayed on the left-side screen (step S44).

Figure 10B:
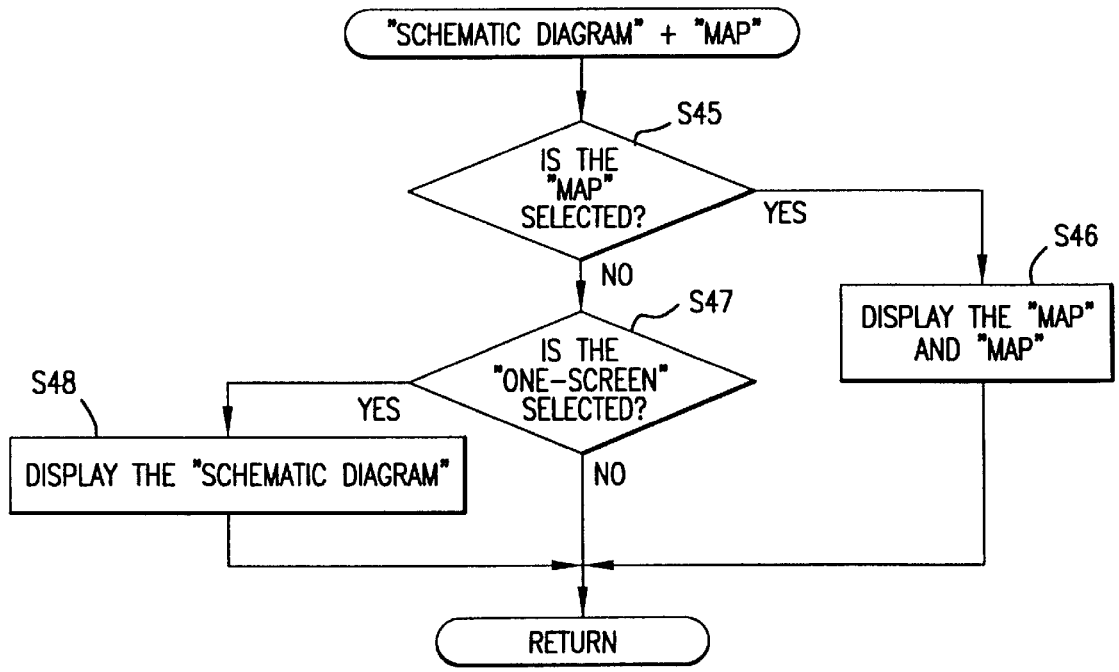
FIG. 10B is a flowchart of another screen change procedure.

Alternatively, as shown in FIG. 10B, in the two-screen mode, where a schematic diagram is displayed on the left-side screen and a map is displayed on the right-side screen. The system checks to see if the "MAP" button is selected (step S44) If the "MAP" button was selected, then a map is displayed in the alternative of the schematic diagram on the left-side screen (step S46). When the map is not selected, the system further checks to see if the "ONE-SCREEN" button is selected (step S47). If the "ONE-SCREEN" button was selected, the system then changes to the one-screen mode and displays the schematic diagram which was displayed on the left-side screen (step S48).

In this way, the navigation apparatus embodying the invention operates to display in the one-screen mode, any one of the various function screens in response to the selection of buttons. When changing to the two-screen mode, the previous screen continues to be displayed on the left-side screen while a guidance screen, such as a present-location map, enlarged intersection diagram, etc. is displayed on the right-side screen. Under this condition, various function screens are displayed on the left-side screen in deference to selection operations of the buttons in a manner similar to that in the one-screen mode. When the display mode returns to the one-screen mode from the two-screen mode, the left-side screen is expanded to be displayed over the entire region of the screen. For example, the guidance screen that was displayed on the right-side screen, (a present-location map, enlarged intersection diagram, etc. or the like) is displayed upon operation of the "RETURN" button.

As noted above, in the two-screen mode, an architectural structure-shape map screen, containing a schematic diagram screen and city map, is displayed along with the present-location map screen in a side-by-side manner. In this mode it becomes possible to obtain useful and visibility-enhanced information such as 3D visual-effect travel images, information as to the shapes of architectural structures involved, etc., which is not obtainable by use of the present location map, enlarged intersection diagram, etc. Furthermore, by selection of screens in conformity with the surrounding atmospheric conditions and travel criteria, it is possible to provide additional information to the needs of the driver. For example, the schematic diagram screen is selected when the vehicle is on a highway and the architectural structure-shape map screen is selected if the vehicle is within a city.

Figure 11A:
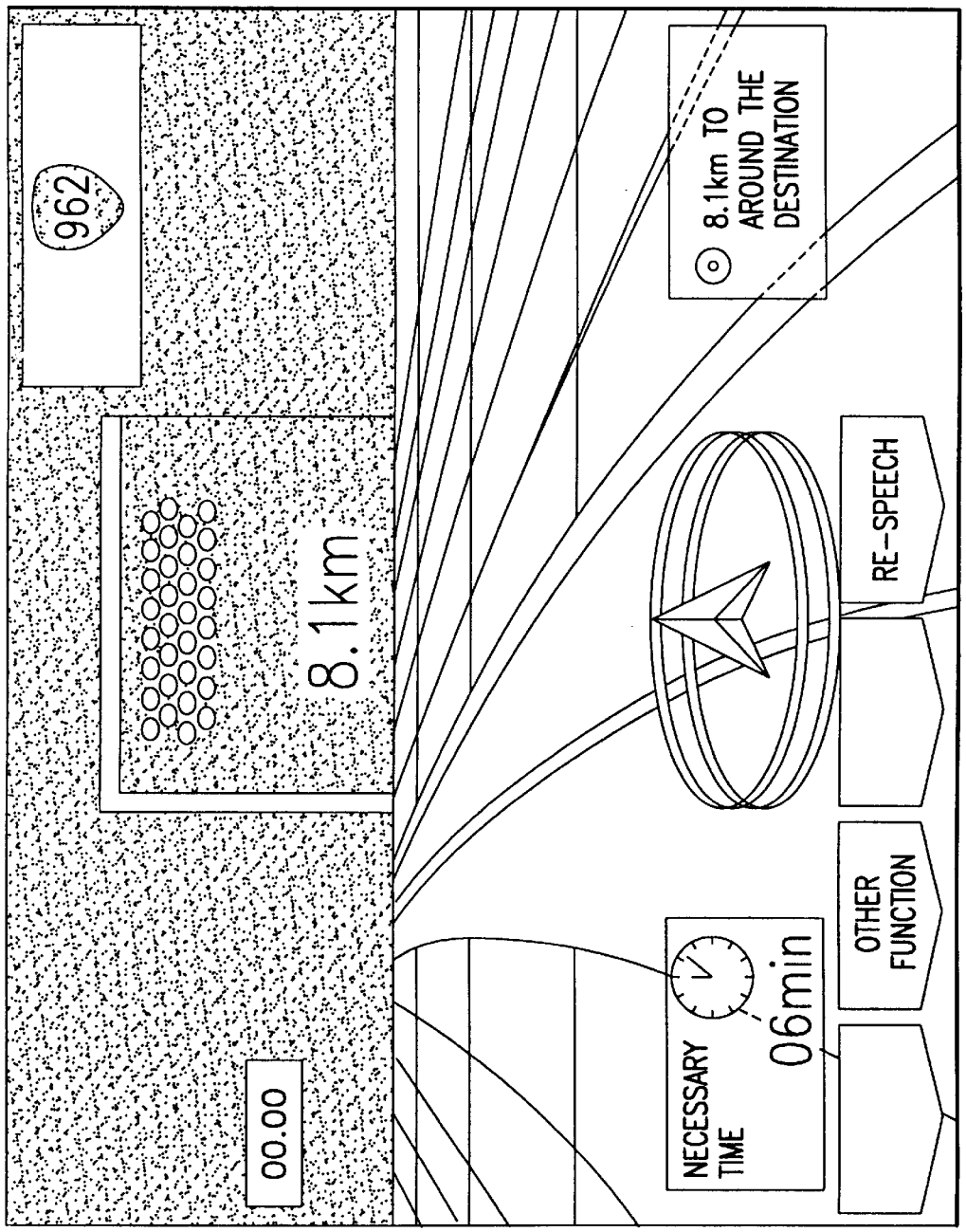
FIGS. 11A and 11B show exemplary schematic diagram screens for displaying the direction of travel by use of a travel image in an easily understood way.
Figure 11B:
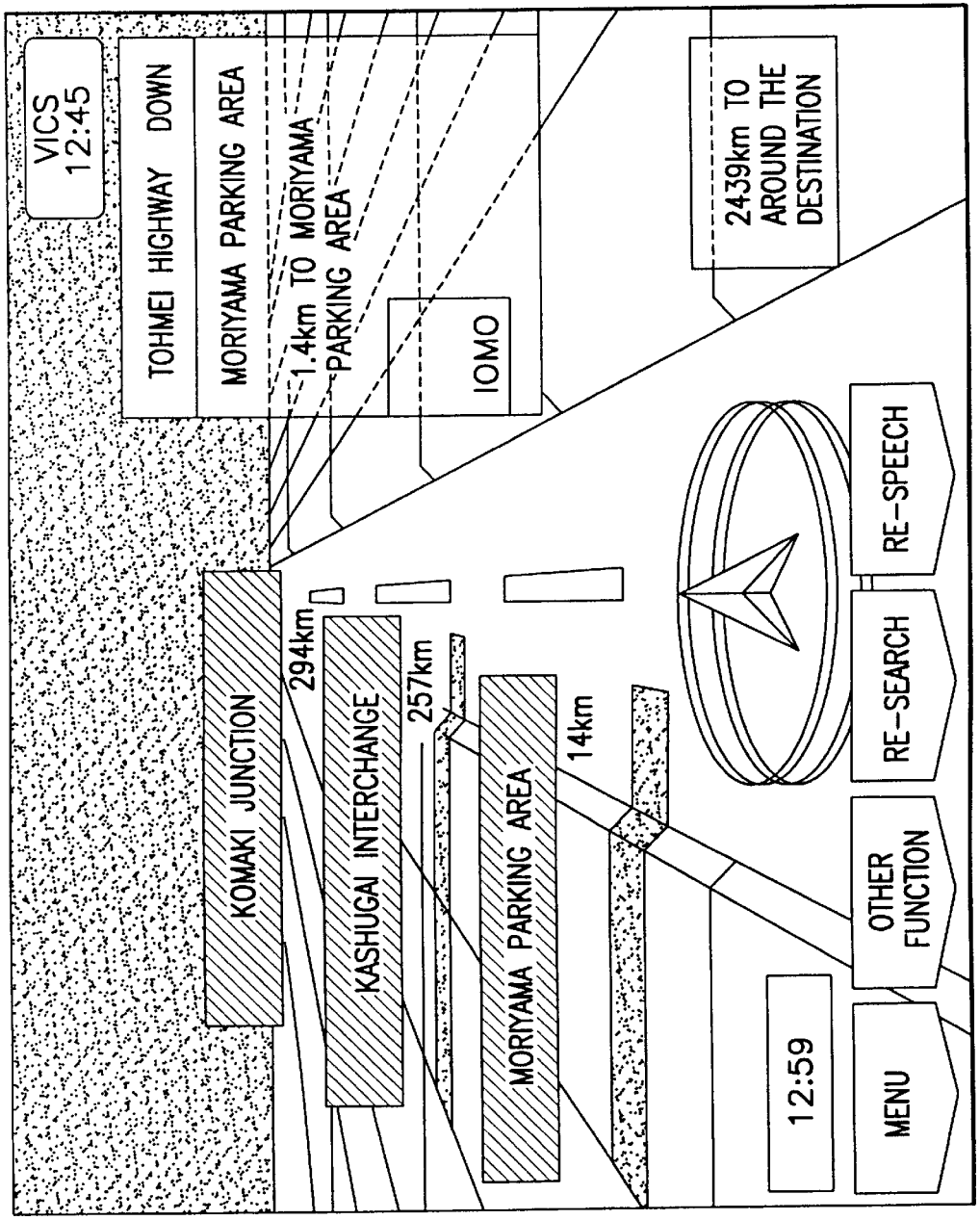

The schematic diagram screen is discussed below. This screen is used, for example, in cases where a road is line-drawn using curves, the road is displayed with 3D visual effects by line-drawing a plurality of lines on the right and left sides of a center line of the road, as shown in FIG. 11A. With such a schematic diagram screen display, it becomes possible to confirm the curvature of the road on the screen in a manner similar to that of the vehicle's actual turn. Also, in addition to a 3D drawing of the road as shown in FIG. 11B, a plurality of route information items are displayed on a drawn map, for forward positions up to a specified distance from the present vehicle position.

In addition, several names or titles are displayed in the forward direction along the direction of travel, such as interchanges, junctions, parking areas, etc. Distance remaining to a present vehicle position to the certain title displayed, highway information concerning road facilities such as gas stations, are also displayed.

For displaying such a schematic diagram screen, a land vehicle navigation apparatus as already proposed by the same applicant (see PUJPA Nos. 7-217865, 8-107921, etc.) may be employed. Note here that in the screen shown in FIG. 11B, while the information for "MORIYAMA PA", is displayed which is the nearest parking area from a present vehicle position, if the user designates "KASUGAI IC" or "KOMAKI JCT", which are highway junctions further away, the system then displays the "MORIYAMA PA" then display the highway information of "KASUGAI IC" or "KOMAKI JCT." Accordingly, with this schematic diagram screen, since a complicated map is not present while 3D-displaying a present vehicle position and associated specific route information concerning objects of the present position, it is possible to easily confirm the objects while driving.

Figure 12:
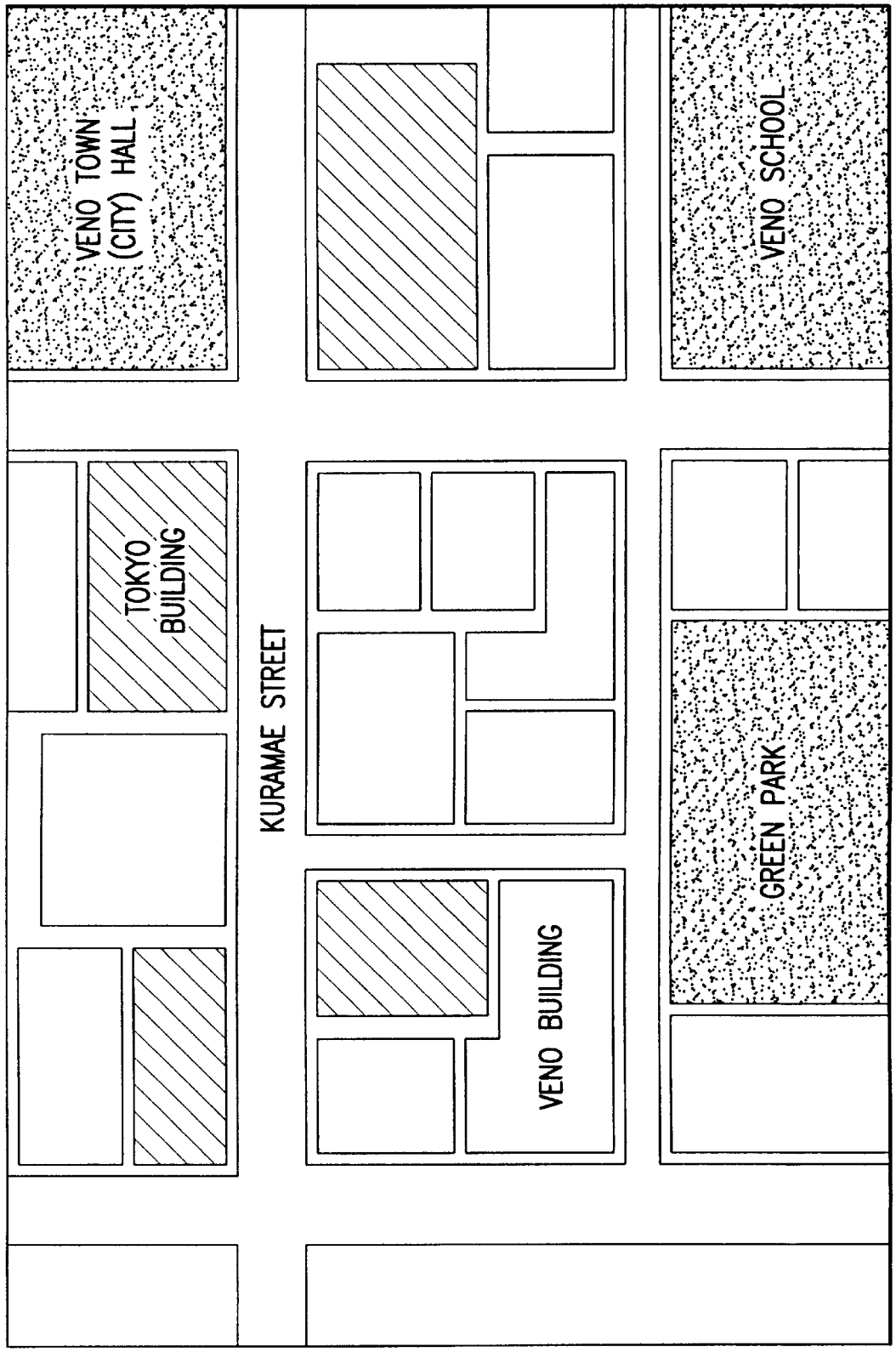
FIG. 12 is an illustration of an exemplary architectural structure-shape map screen displaying the architectural structures involved in a city in an easily understood way.

As shown in FIG. 12, the architectural structure-shape map screen displays the shapes of various types of so-called architectural structures, including buildings (such as ordinary houses, office buildings, apartment houses, fire stations, department stadiums, hospitals, stations, etc.), facilities (such as towers, parks, amusement parks, stadiums, etc.), bridges, roads and other structures, along with their titles or names.

Those architectural structures which are depicted using hatching patterns are ones for which the display form may be changed. In the case of color display, these may be distinctly displayed by use of colors, density, patterns and any possible combinations thereof. Accordingly, the display form will be changed depending upon their titles, data classification and height information. For example, with regard to apartment buildings, it is possible to let a target object in the region be displayed on a map and its characteristics stand out if the building houses a larger number of tenants. In addition, other architectural objects such as public facilities, schools, parks municipal offices, stations and the like, are displayed differently from ordinary ones.

For displaying such maps, an information guidance apparatus using architectural structure shape maps that has been previously proposed by the applicant (see PUJPA Nos. 7-249227 and 7-249969, for example) may be employed.

The architectural structure shape map data may have a coordinate array consisting of a plurality of coordinate values for use in drawing and displaying the shape, names and numbers (addresses) of each architectural structure.

Attribute information belonging to the architectural structures may also be displayed, such as identification, height, constitution (tenants) and telephone numbers. Accordingly, when reading data of an architectural structure shape map, the shapes and names of respective architectural structures are displayed in color independently on the coordinate array. For example, for displays based identifications, heights and other precise information items (such as the scale of constitution), it is possible, upon selection of certain architectural structure on the architectural structures shape map, to search for information belonging to that architectural structure and other related information for guidance. Alternatively, a shape map may be displayed based on the information belonging to the selected architectural structure with selected architectural structure being at the center.

While the invention has been particularly shown and described with reference to the preferred embodiment, it will be understood by those skilled in the art that the foregoing and other changes in form and detail may be made therein without departing from the spirit and scope of the invention.

For example, the foregoing illustrative embodiment is arranged to display the center part of the screen available in the one-screen mode on the left-side screen in the two-screen mode with the center part remaining in the same size. However, the display may be modified in such a way that the entire of the screen is displayed with scale reduced, or alternatively the right-side screen and left-side screen may be reversed.

In addition, the schematic diagram screen with 3D visual image effects and the architectural structure shape map screen are displayed together along with a present location map screen in the two-screen mode. This may be modified so that where a characteristic object is present ahead of the present vehicle position, other kinds of screens are displayed containing information relating to the object, including photographs, overview diagrams, etc. Alternatively, the schematic diagram screen display any commercial navigation program, while the architectural structure shape map screen may be a city map, neighborhood map or a superimposed image thereof. Further, the type of buttons to be displayed at the lower region of the screen should not be limited to the illustrative examples only, and may be freely modified when appropriate.

As is apparent from the foregoing, according to the invention, since the one-screen mode and two-screen modes are such that the one-screen mode corresponds to one screen of the two-screen mode and guidance information, such as a present-location map screen and/or enlarged intersection diagram, is displayed on the remaining display screen, it becomes possible using the two-screen mode to simultaneously display on the guidance screen, several images involving information as to the surrounding environment in the direction of travel. For example, easily understood schematic diagram screens, an architectural structure-shape map screen, such as either city maps or neighborhood maps representing the shapes of nearby architectural structures in an easy-to-see manner, an information screen of any characteristic objects, etc., may be displayed. This enables a successful presentation of information items previously found to be impossible or difficult to be displayed on the guidance screen.

What is claimed is:

1. A navigation apparatus, comprising:
    storage means for storing information for use in providing route guidance to a vehicle operator, said information including map data for route search and route guidance, as well as other guidance data;
    detector means for detecting a present vehicle position;
    input means for inputting commands and information for route search and route guidance;
    display means for visually indicating maps and guidance images relating to route search and route guidance, in a specified display mode being one of a full-screen mode and a multiple-screen mode that permits simultaneous presentation of a plurality of divided screens including at least a first screen and a second screen;
    display control means for changing the full-screen mode to the multiple-screen mode in order to correspond at least a portion of a screen of the full-screen mode to the first screen of the multiple-screen mode and display a navigation related image on the second screen of the multiple-screen mode;
    wherein when changing to the multiple-screen mode during route guidance, the display control means is responsive to receipt of criteria of a present vehicle position, for displaying on the first screen, one of a schematic diagram, representative of a travel image with three-dimensional visual effects, and an architectural structure shape map image, indicative of a shape of an architectural structure.

2. The navigation apparatus of claim 1, wherein the display control means causes the display means to visually indicate the schematic diagram on the first screen when a vehicle is on a highway.

3. The navigation apparatus of claim 1, wherein the display control means causes the display means to display the architectural structure shape map image on the first screen when a vehicle is within populated urban areas.

4. An apparatus for calculating a desired geographical route between locations and for providing navigation route guidance to an operator of a land vehicle, the apparatus comprising:

storage means for storing information including relevant road maps data for use in effecting route search and route guidance, and other guidance data;

detector means for detecting a present vehicle position;

input means for allowing the operator to enter commands and data for route search and route guidance, including route preference for a route or routes to be calculated;

display means for providing a visual display of reference images concerning route search and route guidance, including maps, graphics and messages; and display control means operatively coupled to the storage means, the detector means, the input means and the display means, for controlling operation of the display means for changing between a full-screen mode and a multiple-screen mode and permitting simultaneous presence of a first and a second divided screen;

wherein, the display control means responds to an entry of an input command via said input means for reading guidance data from the storage means and for controlling display of read data at the display means by causing the display means to visually indicate a main reference image representative of the read guidance data in the full-screen mode and, in the multiple-screen mode, causing the display means to continuously display at least part of the main reference image on the first screen while letting the second screen display a subsidiary reference image indicative of automatically selected additional information that is pertinent to the main reference image.

5. The apparatus of claim 4, wherein where the display means visually displays a road map containing a present vehicle position at or near a center thereof in the full-screen mode, the display control means automatically selects, as the subsidiary reference image displayed in the multiple-screen mode, a self-explanatory image representative of detailed road system conditions around the present vehicle position.

6. The apparatus of claim 5, wherein the self-explanatory image includes a three-dimensional graphic representation of a presently selected route containing a road path along which the vehicle is presently traveling.

7. The apparatus of claim 5, wherein the present vehicle position includes one of a present-location map and a detailed wide-area map.

8. The apparatus of claim 5, wherein the self-explanatory image includes a depiction reflecting planar shapes of several architectural objects along a road path for travel around a present vehicle position in cities or towns.

9. The apparatus of claim 8, wherein the depiction contains visual emphasis using shading and descriptive legends added to characteristic facilities along the road path.

10. The apparatus of claim 4, wherein the display control means forces, in the multiple-screen mode, the display means to provide the first and second screens in a side-by-side manner.

11. The apparatus of claim 10, wherein said display control means allows the display means to visually indicate an array of function button images, operative upon manual activation by the operator, to specify a desired function during route guidance.

12. The apparatus of claim 11, wherein the button images include a screen-mode change command switch component operatively coupled to the display control means, and wherein the display control means responds to a manual activation of the switch component to cause the display means to change between the full-screen mode and the multiple-screen mode.

13. The apparatus of claim 11, wherein the display control means changes contents of the function buttons between the full-screen mode and the multiple-screen mode.

14. The apparatus of claim 13, wherein the display control means comprises a digital image processing device.

15. The apparatus of claim 14, wherein the display means includes a color monitor display unit.

16. The apparatus of claim 15, wherein the input means includes an electrical touch-sensitive member operatively associated with the color monitor display unit.

* * * * *